Aug. 24, 1954
J. MacVEIGH
2,687,099
ARTICULATED RAILWAY VEHICLE
Filed July 3, 1947
4 Sheets-Sheet 1
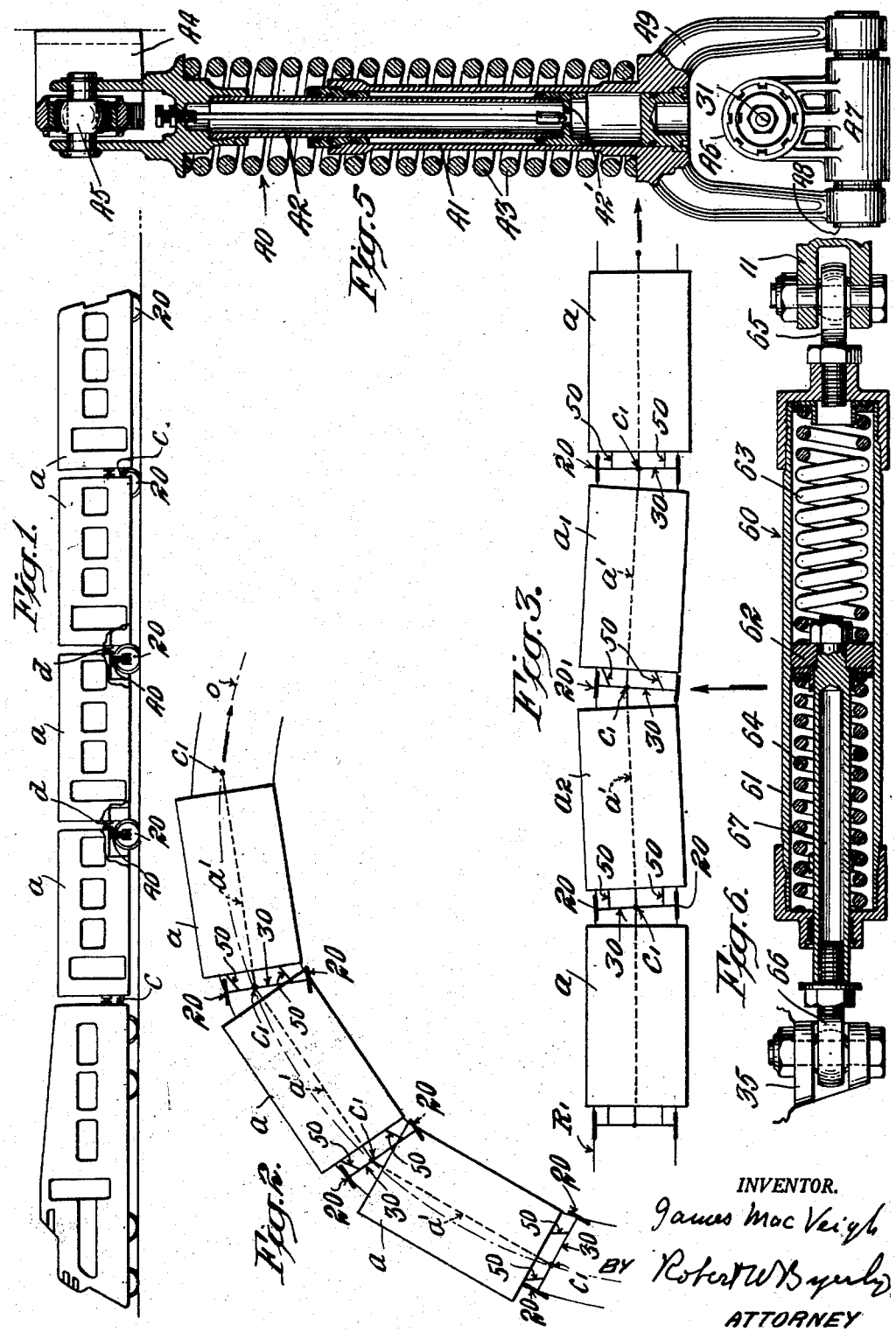
INVENTOR.
James Mac Veigh
BY Robert W Byerly
ATTORNEY

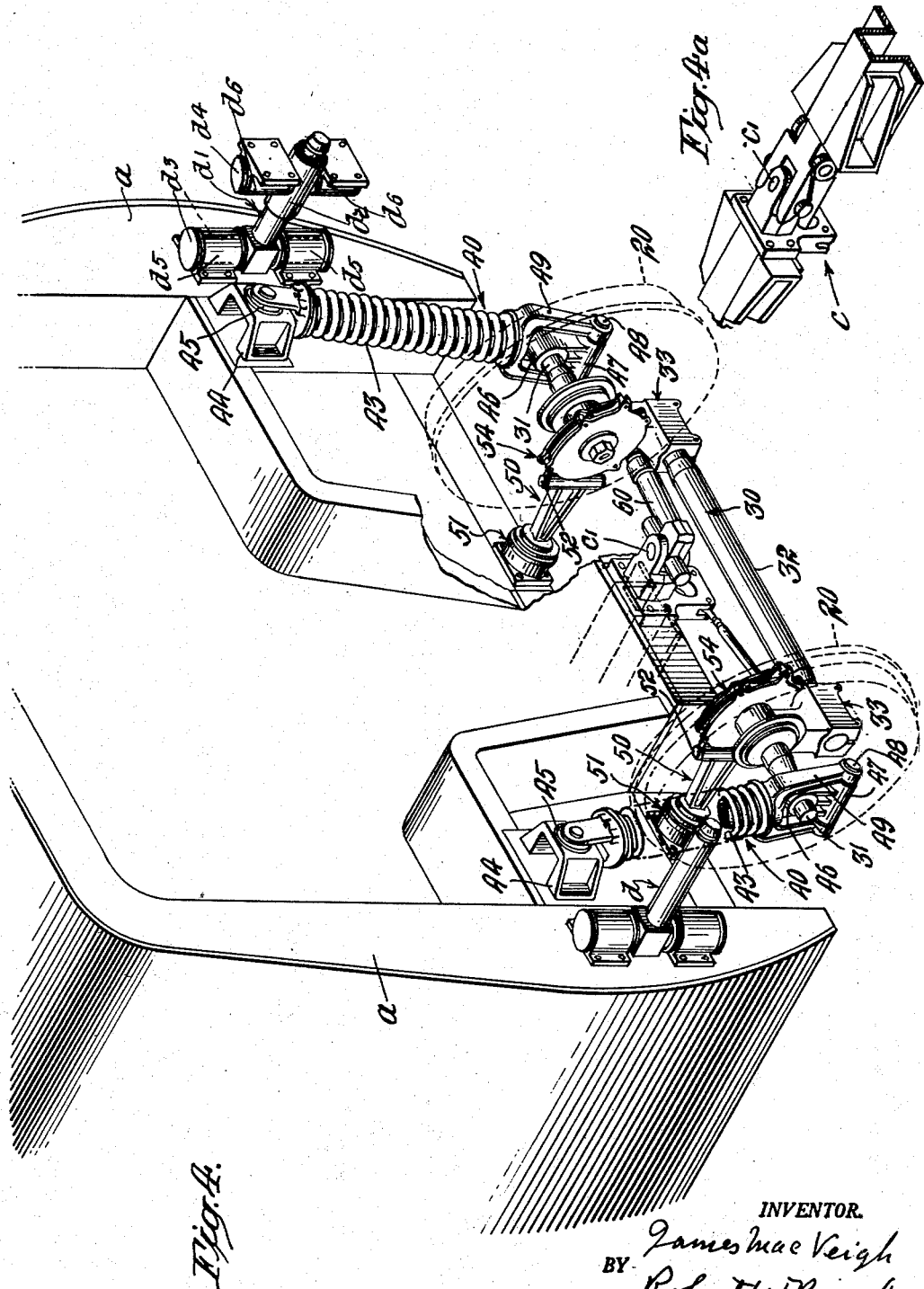

Aug. 24, 1954    J. MacVEIGH    2,687,099
ARTICULATED RAILWAY VEHICLE
Filed July 3, 1947    4 Sheets-Sheet 3
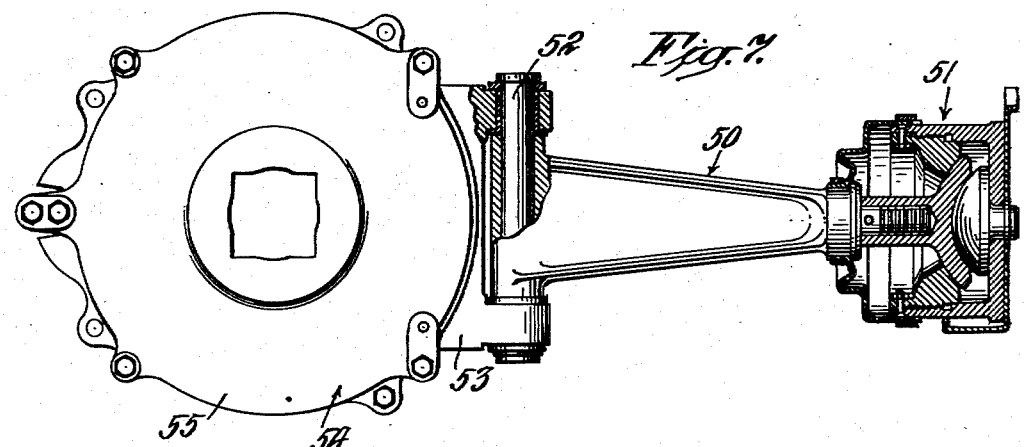
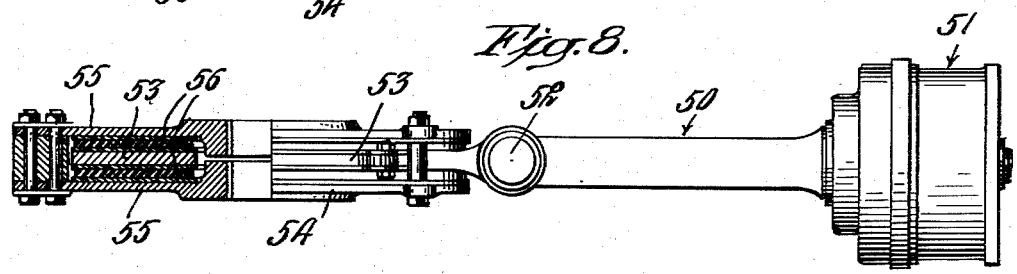
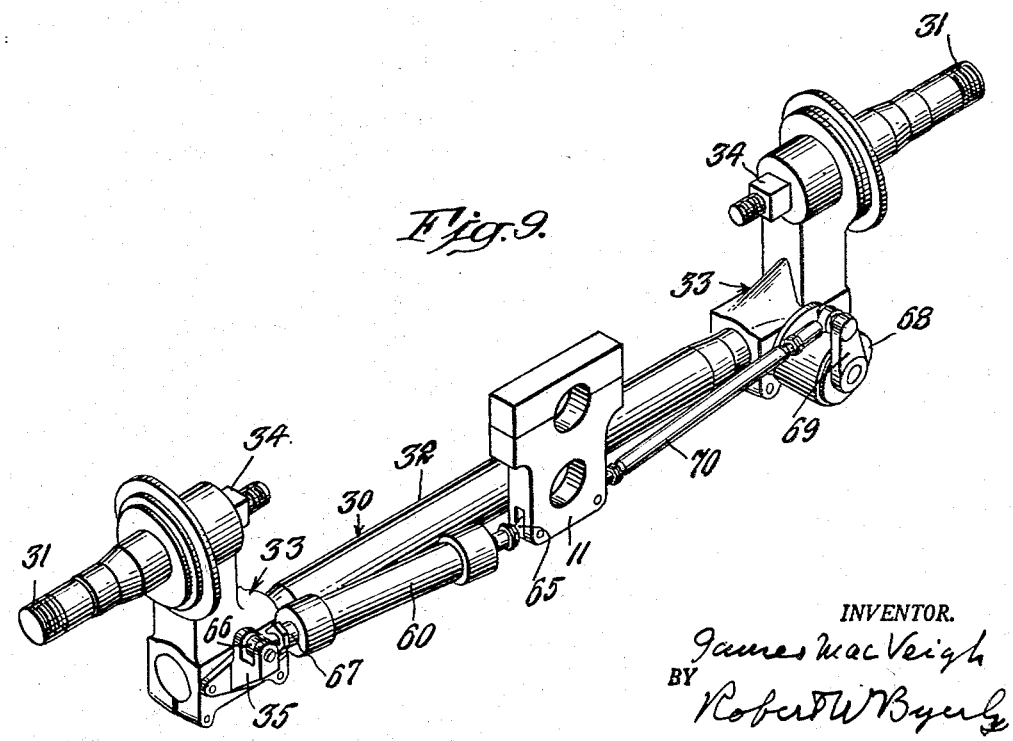
INVENTOR.
James MacVeigh
BY
Robert W Byerly
ATTORNEY Patented Aug. 24, 1954

2,687,099

UNITED STATES PATENT OFFICE 2,687,099

ARTICULATED RAILWAY VEHICLE

James MacVeigh, Madrid, Spain, assignor to Patentes Talgo, S. A., Madrid, Spain, a corporation of Spain Application July 3, 1947, Serial No. 758,887

8 Claims. (Cl. 105—4)

This invention relates to improvements in articulated railway vehicles and aims to provide an improved spring suspension for such vehicles.

The invention is of especial value in connection with articulated railway vehicles of the type shown in application Serial No. 661,699 filed April 12, 1946, now Patent No. 2,462,666, dated February 22, 1949 by Alejandro Goicoechea Omar and assigned to the assignee of this application. In such vehicles, danger of derailment at curves is avoided by guiding the wheels of the vehicle so that on rounding a curve at high speed the outer wheels attack the track at a negative angle of incidence bringing the trailing edge of the wheel flange into contact with the rail so that the friction between them tends to hold the wheel down on the rail. Such guiding of the wheels may be obtained in an articulated vehicle consisting of short rigid sections pivoted together at their ends and having a pair of wheels at the rear end of each section with their axis perpendicular to the axis of the section.

An object of the present invention is to provide a spring suspension permitting such relative movements between each pair of wheels and the vehicle as are desirable for easy riding, while at the same time retaining the important factor of safety which results from making the outer wheels attack the track at a negative angle at curves when the train is moving at high speed.

A further feature of the invention is to introduce an additional safety factor. When a train is running on a straight track, one end of one of the cars is sometimes thrown sideways—by a misalignment of the rails, a switch, or some other cause. In this case, the side thrust of a wheel against the track causes a danger of derailment. This danger is minimized, in accordance with my invention, by providing means for causing the wheel which is forced against the track in the case of a side thrust at any articulation point of the vehicle to attack the track at a negative angle so that the friction between the flange and the rail holds the wheel down on the rail.

While the utility of my invention is not limited to its use in connection with articulated vehicles of the type illustrated in the aforesaid application Serial No. 661,699, I shall, for the sake of illustration, describe a particular embodiment of my new spring suspension applied to such a vehicle. This is illustrated in the accompanying drawings, in which:

Fig. 1 is a side view of the articulated vehicle with parts broken away;

Fig. 2 is a diagrammatic plan view of the vehicle on a curved track;

Fig. 3 is a diagrammatic plan view of the vehicle on a straight track showing the effect of a side thrust at one of the articulation points;

Fig. 4 is a perspective view of the rear end of one of the cars or vehicle sections showing the spring suspension, and Fig. 4A is a perspective view of the traction connection;

Fig. 5 (on Sheet No. 1) is a sectional view of one of the vertical struts and the universal joint at its upper end;

Fig. 6 (on Sheet No. 1) is a sectional view of the horizontal strut and the universal joint at its end;

Figs. 7 and 8 are a side view and a plan view of one of the radius rods and the universal joints at its ends;

Fig. 9 is a perspective view of the dead axle taken from the side opposite to that shown in Fig. 4 and showing the horizontal strut and shock absorber therefor.

Figure 10:
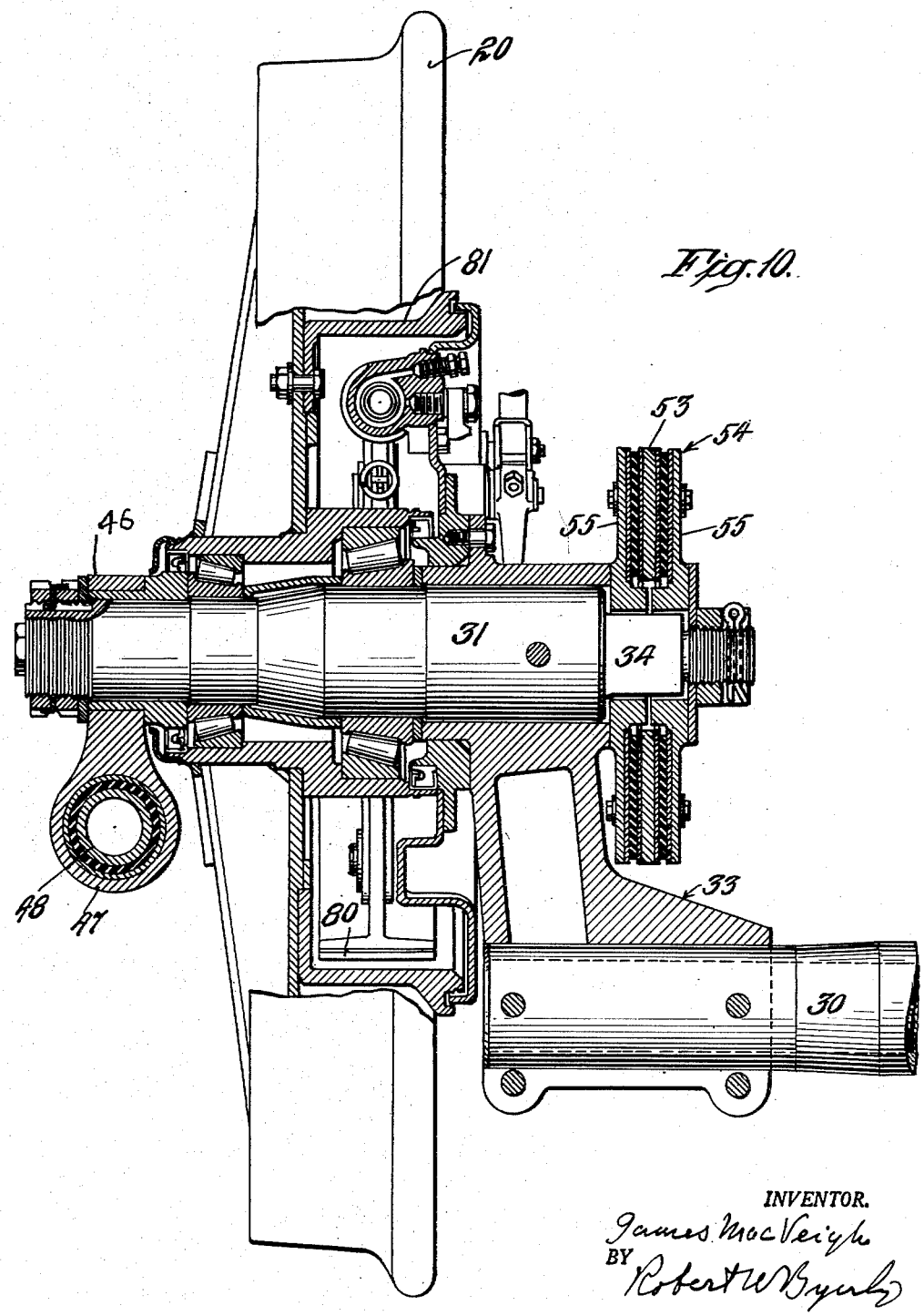
Fig. 10 is an enlarged vertical section of one end of the dead axle and the wheel mounted on it.

The articulated vehicle shown in the drawings consists of a number of rigid tubular body sections or car bodies $a$ with traction connections $c$, each including a vertical pivot $c_1$. The pivots $c_1$ are the articulation points of the vehicle. The body sections $a$ are aligned by sliding, weight-bearing, lateral connections $d$. The connections $d$ are essentially sliding connections each consisting of a slide element $d_1$ and a guide element $d_2$ in which the slide fits. The slide element $d_1$ is secured to a vertical pivot $d_3$ mounted in vertical bearings $d_5$ attached to the rear end of one of the sections $a$. The guide element $d_2$ is attached to a vertical pivot $d_4$ which is mounted in vertical bearings $d_6$ attached to the front end of one of the sections $a$ (see Fig. 4 in which the section $a$ to which the bearing $d_6$ is attached is omitted for the sake of clearness). A pair of wheels 20 is located at the rear end of each section $a$ near one of the articulation points $c_1$. The wheels 20 of each pair of wheels are mounted on stub shafts 31 forming part of a dead axle 30.

The spring suspension to which the present invention is especially directed involves a series of parts connecting each dead axle 30 with the rear end of one of the car bodies $a$. These connecting parts include a pair of substantially vertical spring struts 40, a pair of horizontal radius rods 50 normally extending parallel to the axis of the vehicle, and a horizontal strut 60 containing balanced springs and extending substantially parallel to the axle 30. Universal joints are provided at each end of each connecting part.

The spring struts 40 carry the weight of the adjacent ends of the two body sections which are connected by the lateral connections $d$. The universal joints permit them to act independently, that is, to allow relative tipping of the body and the axle 30. The universal joints also permit relative lateral movement of the body and the axle 30 in the case of side thrusts, but during such movement the axle 30 is maintained perpendicular to the axis $a'$ of the body section to which the radius rods 50 are attached by virtue of the horizontal parallelogram construction. Any lateral movement of the body with respect to the axle is resisted by one or the other of the balanced springs of the horizontal strut 60. These springs normally position the axle 30 so that the radius rods 50 are parallel to the axis of the body section and the spring struts 40 are each slightly outwardly inclined.

The system of connections permits relative movement of the wheels and body in every direction in the vertical plane of the axis of the wheels, and thus provides for every conceivable position of the wheels with respect to the body within the limits necessary for good riding, and provides return forces to bring the body and wheels back to their normal relation as soon as disturbing forces have disappeared. The provision of the horizontal struts 60 with balanced springs makes the system completely stable.

The specific construction of the dead axle and connecting parts which is illustrated in the drawings has a number of functional advantages and will, therefore, be described in detail.

The dead axle 30 is a rigid structure consisting of the two stub shafts 31 and a central bar 32 connected by elbow members 33 which serve to offset the stub shafts from the bar 32 to allow a lowering of the car's center of gravity.

Each spring strut 40 consists of two telescopic tubular members 41, 42 surrounded by a coiled compression spring 43. The upper end of each strut 40 is secured to a bracket 44 mounted on the car body at one side of its rear end and most desirably near or above its center of gravity and close to one of the lateral connections $d$ between the body sections. The upper end of each strut 40 is connected to its bracket 44 by means of a universal joint 45 of the spherical bearing type. The lower end of each strut 40 is connected to one of the outer ends by the dead axle 30 by means of a universal joint including horizontal and vertical pivots. The horizontal pivot is the end of the stub shaft 31 on which a sleeve 46 is journalled. An extension of this sleeve carries the bearing 47 for a horizontal pivot pin 48 mounted in a fork 49 at the lower end of the strut.

The radius rods 50 are connected to the car body by universal joints 51 of the spherical bearing type. The universal joints which connect the outer ends of the radius rods to the dead axle 30 are of the type which provides for turning about vertical and horizontal pivots. Vertical pivot pins 52 connect the rods 50 with plates 53 which form the inner members of so-called rubber sandwiches 54 whose outer plates 55 are mounted on square projections 34 on the inner ends of the stub shafts 31 so that they are held against turning on the dead axle 30. The inner and outer plates 53, 55 of each sandwich 54 are connected by annular discs of rubber 56 which are vulcanized to both of them so as to permit a slight turning of the inner plate 53 with respect to the outer plate against a strong spring resistance. This turning is about the axis of the stub shafts 31 but the rubber discs 56 also permit a slight misalignment of the inner and outer plates 53, 55 which gives a true universal action notwithstanding the fact that the axis of the stub shafts 31 and the axes of the vertical pivots 52 do not intersect. The slight universal movement permitted by the rubber discs is sufficient to permit such slight tilting of the axle 30 as is necessary for the independent action of the spring struts 40 required for easy riding. Besides serving as part of the universal joints at the outer ends of the radius rods 50, the rubber sandwiches 54 have an additional function which is hereinafter explained.

Each horizontal spring strut 60 includes a tubular member 61 containing a sliding block 62. Balanced compression springs 63, 64 normally retain the block 62 at the center of the tubular member 61 and restore it to this position after displacement in either direction. The fastenings 65, 66 at the opposite ends of the strut 60 are secured, one to the tubular member 61, and the other by means of a rod 67 to the block 62. One of these fastenings is connected by means of a universal joint of the spherically curved bearing type to a bracket 35 mounted on one of the elbow members 33 of the dead axle 30. The other one is secured by means of a similar universal joint to a block 11 secured at the end of the center sill of the car body and forming part of the car body. The spring strut 60 limits the lateral movement of the axle 30 with respect to the car body sufficiently to prevent swinging either of the vertical spring struts 40 to or beyond a vertical position, and thus secures the stability of the suspension.

Independent shock absorbers are provided to control the action of the vertical spring struts 40 and the horizontal spring struts 60. Shock absorbers for the vertical spring struts are provided within the tubes 41, 42 of the vertical struts. The tubes are filled with liquid which flows through an adjustable opening in a plunger 42' when the struts 40 are extended or contracted. A conventional shock absorber 68 of the Houdaille type is provided in connection with the spring strut 60 in the form illustrated in the drawings. The arm 69 of this shock absorber is connected with the block 11 of the car body by a rod 70, so that any relative lateral movement of the axle and the car body which is opposed by one of the springs of the spring struts 60 is also damped by the shock absorber 68.

Brakes, most desirably of the hydraulic type, are provided for the wheels 20. They include brake shoes 80 mounted on the stub shafts 31 of the dead axle 30 and hydraulically actuated to engage the inner surface of a brake drum 81 carried by the wheels 20. When the brakes are applied, the reaction tends to rotate the whole dead axle structure about the wheel axis. Such rotation is opposed by the rubber sandwiches 54 whose inner plates are secured to the radius rods 50 as described above. The rubber discs 56 yield sufficiently to cushion this braking reaction so that no shock is felt on the car body.

In the operation of the articulated vehicle which has been described, danger of derailment is avoided. The wheels are so guided that, whenever the flange of a wheel is forced against the side of the outer rail, the wheel attacks the rail at a negative angle, so that the friction between the trailing side of the flange and the rail tends to hold the wheel down on the rail. This action is illustrated in Figs. 2 and 3 in which the extent of the lateral movement of the car bodies with respect to the wheels is considerably exaggerated for the sake of clearness.

Fig. 2 shows the vehicle rounding a curve. In this position, the body sections are thrown outwardly with respect to the wheels by centrifugal force bringing the articulation points $c_1$ on a circle O somewhat larger than the median circle of the tracks. The axes $a'$ of the car bodies lie on chords of this circle, and the wheel axes are held perpendicular to these chords by the radius rods 50 so that each outer wheel will engage the track at a negative angle as shown in Fig. 2. Thus, the spring suspension which allows lateral movement of the wheels does not eliminate the safety factor at curves which was obtained in previous vehicles of this type in which no such lateral movement was permitted.

Fig. 3 shows the articulated vehicle running on a straight track and indicates the effect of a side thrust from any cause applied to the vehicle at one of its articulation points. The effect of such a side thrust is to throw one of the wheels $20_1$ against one of the rails $R_1$ and at the same time to throw the rear end of the car body $a_1$ to the side, so that its axis $a'$ is inclined inwardly from the rail $R_1$. On this movement of the body section $a_1$, the radius rods 50 incline the dead axle 30 to keep the wheels parallel with the axis of the body. Consequently the burdened wheel $20_1$ is inclined to attack the rail $R_1$ at a negative angle. The pressure between the flange of the wheel $20_1$, and the rail $R_1$ caused by the side thrust thus creates friction between the trailing edge of the flange and the rail, and this holds the wheel down on the rail.

What I claim is:

1. A railway vehicle comprising an articulated body consisting of a plurality of rigid sections, pairs of wheels supporting the body and located at or near its articulation points, a connection between each pair of wheels and the section in advance of it arranged to permit lateral movement of the pair of wheels and to maintain the axis of the pair of wheels perpendicular to the axis of said section during such movement, and resilient means opposing lateral movement of the wheels, whereby a lateral force on the vehicle at any articulation point thereof causes the wheel receiving such force to attack the track at a negative angle when the vehicle is running on a straight track.

2. In a railway vehicle, the combination with an articulated body consisting of two rigid sections connected by a central vertical pivot and lateral weight-bearing connections, of a wheel axle located near the articulation point of the body, substantially vertical spring struts extending from the end portions of the axle to points of one of the sections near the lateral connections to carry the weight of the adjacent ends of the sections, a pair of parallel horizontal radius rods connecting the axle with one of the sections to maintain it perpendicular to the axis of that section, and means for limiting lateral movement of the axle with respect to the body.

3. A spring suspension for railway vehicles, comprising the combination with a vehicle body and a wheel axle, of a pair of substantially vertical spring struts supporting opposite sides of the end of the vehicle on the axle, universal joints connecting the ends of the struts to the axle and to the body, said spring struts being independently compressible so as to permit tilting of the vehicle body, a pair of parallel horizontal radius rods, universal joints connecting the ends of the rods to the vehicle body and to the axle, the universal joints at one end of the rods including free vertical pivots and resilient connections resisting torque about a horizontal axis, so as to permit lateral movement of the axle with respect to the body and to resist the tilting action of the vehicle body which is permitted by said vertical spring struts.

4. A spring suspension for railway vehicles consisting of the combination of a vehicle body and a wheel axle, of separate springs supporting the end of the vehicle body on the axle at opposite sides of the vehicle, said springs being independently compressible so as to permit tilting of the vehicle body, a pair of horizontal radius rods, universal joints connecting the ends of the rods to the vehicle body and the axle, the universal joints at one end of the rods including resilient torque-resisting connections restraining the tilting action of the vehicle body permitted by the supporting springs.

5. In a railway vehicle, the combination with a vehicle body and a wheel axle, of weight-bearing longitudinally resilient struts at opposite sides of the body supporting the body on the axle and lying in the vertical plane of the axle and slightly inclined to the vertical in opposite directions, universal joints connecting the ends of the struts to the axle and to the body, a connection between the axle and the body permitting lateral movement of the axle with respect to the body and restraining tilting movement of the axle with respect to the body, and means for limiting the lateral movement of the axle in each direction to a distance less than that which would swing one of the spring struts through a vertical position.

6. In a railway vehicle, the combination with an articulated body consisting of two rigid sections connected at adjacent ends by a central universal coupling and lateral weight-bearing connections, of a wheel axle located near the articulation point of the body sections, substantially vertical spring struts extending from the end portions of the axle to points on one of the body sections near the weight-bearing connections to carry the weight of the adjacent ends of the body sections, said spring struts permitting lateral movement and transverse tilting of the associated body section relative to the axle, means for limiting lateral movement of the body sections with respect to the associated axle, and a pair of parallel horizontal radius rod structures connected by universal joints with the axle and the body section mounted on the axle, said joints permitting movement of said rod structure about vertical and transverse axes on the lateral and tilting movement of the associated body section relative to its axle as allowed by said spring struts and said lateral movement limiting means.

7. A spring suspension for railway vehicles consisting of the combination of a vehicle body and a wheel axle, of separate springs supporting one end of the vehicle body on the axle at opposite sides of the vehicle, said springs being independently compressible so as to permit transverse tilting of the vehicle body relative to the axle, a pair of horizontal radius rod structures, and universal joint means connecting the ends of the rod structures to the vehicle body and the axle, the universal joints at one end of the rods including resilient connections permitting movement of the rod structures about vertical and transverse axes on movements of the body relative to the axle in the transverse tilting allowed by the supporting springs.

8. In a railway vehicle, the combination with an articulated body consisting of two rigid sections connected by a central vertical pivot, of a wheel axle located near the articulation point of the body, substantially vertical spring struts extending from the end portions of the axle to points of one of the sections to carry the weight of the adjacent ends of the sections, a pair of horizontal radius rods connecting the axle with one of the sections, and means for limiting the lateral movement of the axle with respect to the body.

References Cited in the file of this patent

UNITED STATES PATENTS

| Number | Name | Date |
|---|---|---|
| 267,335 | Driggs | Nov. 14, 1882 |
| 1,238,105 | Church | Aug. 28, 1917 |
| 1,480,634 | Putnam | Jan. 15, 1924 |
| 1,954,705 | Kruckenberg et al. | Apr. 10, 1934 |
| 2,098,949 | Geissen | Nov. 16, 1937 |
| 2,252,789 | Van Dorn | Aug. 19, 1941 |
| 2,320,086 | Ledwinka | May 25, 1943 |
| 2,373,348 | Schroeder et al. | Apr. 10, 1945 |
| 2,462,666 | Omar | Feb. 22, 1949 |

FOREIGN PATENTS

| Number | Country | Date |
|---|---|---|
| 606,366 | France | Mar. 8, 1926 |
| 297,438 | Great Britain | Dec. 13, 1928 |